(12) United States Patent
Gromes et al.

(10) Patent No.: US 11,994,415 B2
(45) Date of Patent: May 28, 2024

(54) ENCODER SYSTEM FOR A DRIVE

(71) Applicant: WITTENSTEIN SE, Igersheim (DE)

(72) Inventors: Tobias Gromes, Laudenbach (DE); Ralf Kruse, Würzburg (DE); Ingolf Gröning, Bad Mergentheim (DE)

(73) Assignee: WITTENSTEIN SE, Igersheim (DE)

( * ) Notice: Subject to any disclaimer, the term of this patent is extended or adjusted under 35 U.S.C. 154(b) by 234 days.

(21) Appl. No.: 17/371,181

(22) Filed: Jul. 9, 2021

(65) Prior Publication Data
US 2022/0011140 A1  Jan. 13, 2022

(30) Foreign Application Priority Data

Jul. 9, 2020 (DE) ............. 10 2020 118 174.4

(51) Int. Cl.
*G01D 5/249* (2006.01)
*G01D 5/14* (2006.01)
(Continued)

(52) U.S. Cl.
CPC .......... *G01D 5/2497* (2013.01); *G01D 5/145* (2013.01); *G01D 5/16* (2013.01); *H02K 7/003* (2013.01);
(Continued)

(58) Field of Classification Search
CPC ........ G01D 5/2497; G01D 5/145; G01D 5/12; G01D 5/14; G01D 5/142; G01D 5/16;
(Continued)

(56) References Cited

U.S. PATENT DOCUMENTS

| 2012/0146627 A1* | 6/2012 | Masson | G01B 7/30 324/207.21 |
| 2016/0056691 A1* | 2/2016 | Hale | H02K 11/21 310/68 B |

(Continued)

FOREIGN PATENT DOCUMENTS

| DE | 102004062448 A1 | 1/2006 |
| DE | 102007039050 A1 | 2/2009 |

(Continued)

OTHER PUBLICATIONS

English translation of WO-2019188859-A1 (Year: 2019).*
(Continued)

*Primary Examiner* — Tulsidas C Patel
*Assistant Examiner* — Joshua Kiel M Rodriguez
(74) *Attorney, Agent, or Firm* — Bachman & LaPointe, P.C.

(57) ABSTRACT

Encoder system (1) for a drive, including a revolution counter having a Wiegand sensor (23) which is disposed on a stationary part (13) of the encoder system (1), and at least two pairs of magnets which in the revolving direction (5) are disposed at different positions on a rotatable part (15) of the encoder system (1), wherein the pairs of magnets comprise in each case a first magnet (35) and a second magnet (37); and a position encoder having a magnetic field sensor (43) which is disposed on the stationary part (13), and a magnetic strip (47) which is disposed on the rotatable part (15); wherein, in each pair of magnets, the first magnet (35), the magnetic strip (47) of the position encoder, and the second magnet (37) in terms of a first direction are disposed in this sequence on the rotatable part (15).

15 Claims, 4 Drawing Sheets

(51) Int. Cl.
  *G01D 5/16* (2006.01)
  *H02K 7/00* (2006.01)
  *H02K 11/215* (2016.01)

(52) U.S. Cl.
  CPC ........ *H02K 11/215* (2016.01); *H02K 2211/03* (2013.01)

(58) Field of Classification Search
  CPC .. G01D 2205/26; G01D 5/245; G01D 5/2454; G01D 5/2458; H02K 7/003; H02K 11/21; H02K 11/215; H02K 2211/03
  See application file for complete search history.

(56) References Cited

U.S. PATENT DOCUMENTS

| | | | | |
|---|---|---|---|---|
| 2016/0061630 | A1* | 3/2016 | Ausserlechner | G01D 5/145 324/207.21 |
| 2016/0238410 | A1* | 8/2016 | Steinich | G01D 5/145 |
| 2017/0146365 | A1* | 5/2017 | Hanke | G01D 5/12 |
| 2019/0025085 | A1* | 1/2019 | Duret | G01D 5/2452 |
| 2019/0271569 | A1* | 9/2019 | Ganser | G01D 5/145 |

FOREIGN PATENT DOCUMENTS

| | | | |
|---|---|---|---|
| DE | 102009017719 A1 | 10/2010 | |
| DE | 102012008888 A1 | 10/2013 | |
| JP | 6054011 B1 * | 12/2016 | ............. G01D 5/245 |
| JP | 2019152654 A * | 9/2019 | ........... G01D 11/245 |
| WO | WO-2019188859 A1 * | 10/2019 | ............. G01D 5/145 |

OTHER PUBLICATIONS

English translation of JP-6054011-B1 (Year: 2016).*
English translation of JP-2019152654-A (Year: 2016).*
"Neodymium Magnets NEOREC Series Product Guide," Mar. 2017, TDK Corporation (Year: 2017).*
"Ferrite Magnets FB Series Product Guide," May 2014, TDK Corporation (Year: 2014).*
International search report for patent application No. 10 2020 118 17 4.4 dated Jun. 23, 2021.
European search report for patent application No. 21183707.5-1010 dated Nov. 30, 2021.

* cited by examiner

ENCODER SYSTEM FOR A DRIVE

FIELD OF THE INVENTION

The disclosure relates to an encoder system for a drive and an electric motor.

PRIOR ART

Encoder systems which comprise a magnetic revolution counter (multi-turn encoder) and a magnetic position encoder (single turn encoder) are known from the prior art. A revolution counter is usually specified for counting the revolutions of a shaft of a motor. A position encoder usually determines an angular position of the shaft. Respective magnetic circuits and magnetic sensors of the revolution counter and of the position encoder are often spatially separated from one another in order to avoid any distortion of the magnetic fields of the respective other encoder.

However, the encoder systems known from the prior art require a large installation space, have a large diameter or a high inertial moment, have little accuracy, or are provided only for disposal on an end of a shaft.

SUMMARY OF THE INVENTION

It is an object of the disclosure to specify an encoder system for a drive and an electric motor which are improved in comparison to the prior art. An encoder system which can be constructed or installed in a particular space-saving manner, or has a low inertia moment, a high accuracy, or which permits simple production or assembly, is to be specified in particular.

The object is achieved by an encoder system for a drive as disclosed herein and by an electric motor and an encoder system also as disclosed herein according to the coordinate claims.

Specified according to one aspect is an encoder system for a drive, comprising a revolution counter having a Wiegand sensor which is disposed on a stationary part of the encoder system, and at least two pairs of magnets which in the revolving direction are disposed at different positions on a rotatable part of the encoder system, wherein the pairs of magnets comprise in each case a first magnet and a second magnet; and a position encoder having a magnetic field sensor which is disposed on the stationary part, and a magnetic strip which is disposed on the rotatable part; wherein, in each pair of magnets, the first magnet, the magnetic strip of the position encoder, and the second magnet in terms of a first direction are disposed in this sequence on the rotatable part.

Specified according to a further aspect is an electric motor having a shaft and an encoder system according to embodiments described herein.

A further aspect relates to an encoder system for a drive, comprising a revolution counter having a first sensor, wherein the first sensor is disposed on a first sensor board of the encoder system; a position encoder having a second sensor, wherein the second sensor is disposed on a second sensor board of the encoder system; and a motherboard which is specified for connecting to a housing of the drive; wherein the first sensor board and the second sensor board are connected directly to the motherboard.

Typical embodiments of the encoder system are specified for a drive, in particular for an electric machine, for example for an electric motor or a gearbox.

In typical embodiments, the encoder system comprises a revolution counter and a position encoder. In typical embodiments, the revolution counter and the position encoder are in each case based on a magnetic measuring principle. The revolution counter is in particular embodied as a magnetic revolution counter. The revolution counter is typically specified for counting revolutions of a shaft of the drive. "Revolutions" here are to be understood to be, for example, full revolutions, half-revolutions, quarter-revolutions or eighth-revolutions. The revolution counter can be specified for counting revolutions in a manner specific to a direction of rotation.

The revolution counter typically comprises a Wiegand sensor. A Wiegand sensor, also referred to as a pulse wire sensor, typically comprises a Wiegand wire and a Wiegand coil. The Wiegand coil can be disposed about the Wiegand wire, for example. A Wiegand wire typically has parallel magnetically soft and magnetically hard regions. The Wiegand wire has in particular a hysteresis curve having in most instances two pronounced reversal points. In particular, when a magnetic field in or about the Wiegand wire changes, a type of macroscopic Barkhausen effect, commonly known as the Wiegand effect, can arise. A sudden change in the magnetization of the Wiegand wire can induce a voltage pulse in the Wiegand coil, the magnitude and shape thereof not being a function of how fast the outer magnetic field changes. The Wiegand sensor is typically specified for counting revolutions of the shaft in the state of the encoder system under a voltage or in the state of the encoder system without a voltage, in particular in the state under a voltage or in the state without a voltage. When the shaft of the drive is rotated, a magnet, or a pair of magnets, connected to the shaft in a rotationally fixed manner can generate a variable magnetic field on the Wiegand sensor which is attached in a stationary manner. For example, a voltage pulse generated indicates at least a partial rotation of the shaft, in particular half a rotation, a quarter of a rotation, or an eighth of a rotation. In embodiments, the voltage pulses can be used for memorizing the revolutions in a non-volatile memory.

In typical embodiments, the Wiegand sensor is disposed on the stationary part of the encoder system. The stationary part of the encoder system is typically specified for connecting in a rotationally fixed manner to a housing of the drive, or is connected in a rotationally fixed manner to the housing. The stationary part does in particular not rotate conjointly with a shaft of the drive. For example, the Wiegand sensor can be disposed on top of or on a first sensor board of the encoder system.

The revolution counter typically comprises at least two pairs of magnets. The pairs of magnets are typically disposed on the rotatable part of the encoder system. The rotatable part of the encoder system is typically specified for connecting in a rotationally fixed manner to a shaft of the drive, or is connected in a rotationally fixed manner to the shaft. The rotatable part of the encoder system is typically rotatable about a rotation axis of the encoder system. The rotation axis can in particular correspond at least substantially to a shaft axis of a shaft of the drive.

In typical embodiments, the at least two pairs of magnets in the revolving direction are disposed at different positions. For example, two pairs of magnets can be disposed opposite one another. The revolution counter typically comprises two, four or eight pairs of magnets. In particular, the pairs of magnets can be uniformly disposed in the revolving direction, or disposed at equidistant positions in the revolving direction.

In typical embodiments, the pairs of magnets comprise in each case a first magnet and a second magnet. The first magnet of a pair of magnets and the second magnet of the pair of magnets in the revolving direction are typically disposed so as to be at least substantially at the same position. A first magnetic dipole moment of the first magnet is typically aligned so as to be at least substantially antiparallel to a second magnetic dipole moment of the second magnet. In further embodiments, the dipole moments of the first magnet and of the second magnet can be aligned at other angular positions so as to generate a magnetic circuit with first flux lines.

The first magnetic dipole moment and the second magnetic dipole moment are typically aligned so as to be at least substantially perpendicular to a connecting axis between the first magnet and the second magnet. At least substantially perpendicular, at least substantially parallel, at least substantially antiparallel here is in particular to be understood to be an exactly perpendicular, parallel or antiparallel alignment, or a variance of at most 15°, in particular of at most 10°, or of at most 5°, from an exactly perpendicular, parallel or antiparallel alignment.

The first magnets and the second magnets in the revolving direction are typically disposed at alternating polarities. In the rotation of the shaft, the pairs of magnets generate in an alternating manner in particular opposing magnetic fields at the location of the Wiegand sensor. The first magnet and the second magnet are typically permanent magnets, in particular permanent magnets having a high energy density and remanence induction, for example magnets containing neodymium, in particular neodymium iron boron magnets. The first magnet and the second magnet are typically embodied as block magnets.

Typical encoder systems comprise a position encoder, in particular a magnetic position encoder. The position encoder is typically specified for determining an absolute position of the shaft, for example an angular alignment of the shaft. The position encoder typically comprises a magnetic field sensor. The magnetic field sensor is typically disposed on the stationary part of the encoder system, for example on a second sensor board of the encoder system. In typical embodiments, the magnetic field sensor is embodied as a Hall sensor or as a Hall sensor array having, for example, 4 Hall sensors or 8 Hall sensors, or any other number of Hall sensors, or as a sensor coil, or as MR (magnetoresistive) sensors, or as a GMR (giant magnetoresistance) sensor, or as a GRM sensor array.

In typical embodiments, the position encoder comprises a magnetic strip. The magnetic strip is typically embodied so as to be encircling about the shaft or about the rotatable part of the encoder system. An air gap between the magnetic strip and the magnetic field sensor is typically at most 1 mm, in particular at most 0.7 mm, or at most 0.5 mm, or at least 0.1 mm, in particular at least 0.2 mm. A minor air gap between the magnetic strip and the magnetic field sensor can enable a particularly accurate determination of the magnetic fields of the magnetic strip by the magnetic field sensor.

In typical embodiments, the magnetic strip comprises at least two magnetic tracks, for example exactly two or exactly three magnetic tracks. The magnetic tracks in the revolving direction typically have in each case magnetic portions of alternating polarities. The magnetic tracks are typically magnetized so as to have a weak magnetization. For example, the magnetic portions of the magnetic tracks can comprise ferrite, in particular hard ferrite, or be composed of ferrite.

The magnetic strip in the revolving direction typically has a code, in particular a magnetic code. The code is typically suited for the magnetic embodiment of the scale, in particular for determining the absolute position of the shaft. The magnetic strip, in particular the at least two magnetic tracks, can have, for example, a Nonius code (Vernier code) or a Gray code. For example, the magnetic strip can have two magnetic tracks with divisions according to the Nonius principle. For example, the magnetic strip can have two magnetic tracks with divisions which in terms of the number of pairs of poles differ by 1. For example, a first magnetic track may have 63 pairs of poles, and a second magnetic track may have 64 pairs of poles. An absolute position or an angular position of the shaft is typically determined by an algorithm, for example a Nonius algorithm, based on an unequivocal phase relationship of the magnetic fields measured on the respective magnetic tracks. In other embodiments, the magnetic strip can have three or even more tracks.

In typical embodiments, in each pair of magnets, the first magnet, the magnetic strip of the position encoder, and the second magnet in terms of a first direction are disposed in this sequence on the rotatable part. In particular, the magnetic strip in terms of the first direction is disposed between the first magnet of a pair of magnets and the second magnet of the pair of magnets. For example, the first direction for each magnetic pair can be directed in the direction of a connecting axis between the first magnet and the second magnet. The first direction is typically aligned so as to be axial or radial. A disposal of the magnetic strip between a first magnet and a second magnet can in particular offer the advantage that the encoder system can be constructed in a particularly compact manner.

In typical embodiments, the encoder system comprises at least one first discharge element which is of a magnetically conductive material and disposed between the respective first magnet and the magnetic strip, or between the respective second magnet and the magnetic strip. In particular, the at least one first discharge element in each pair of magnets, in terms of the first direction, is disposed between the first magnet and the magnetic strip, or between the second magnet and the magnetic strip. In particular, two first discharge elements in each pair of magnets, in terms of the first direction, are disposed between the first magnet and the magnetic strip, and between the second magnet and the magnetic strip.

The at least one first discharge element is typically disposed on the rotatable part. For example, first discharge elements in the revolving direction can in each case be disposed at the positions of the pairs of magnets. In particular, the first discharge elements can in each case be identically embodied or be in each case identically disposed in terms of the pairs of magnets. In further typical embodiments, the at least one first discharge element is disposed so as to be encircling about the rotatable part of the encoder system. The at least one first discharge element can typically be configured so as to be at least substantially in the shape of a ring, or as a disk. The at least one first discharge element can in particular be disposed so as to be coaxial with the rotation axis of the encoder system.

The at least one first discharge element typically comprises, or is composed of, a magnetically conductive material. A magnetically conductive material here is to be understood to be in particular a ferromagnetic material or a ferrimagnetic material. The at least one first discharge element in each pair of magnets is typically specified for discharging stray fields of the first magnet or of the second magnet. For example, the at least one first discharge element is specified for discharging the stray fields in a second direction, wherein the second direction is aligned so as to be at least substantially perpendicular to the first direction. The at least one first discharge element is in particular specified for discharging the stray fields such that the stray fields are reduced at the location of the magnetic strip or at the location of the magnetic field sensor.

In typical embodiments, the encoder system comprises a second discharge element which is of a magnetically conductive material and disposed on the stationary part. The magnetic field sensor of the position encoder, in terms of the second direction, which is aligned so as to be at least substantially perpendicular to the first direction, is typically disposed between the magnetic strip and the second discharge element. The second direction lies in particular in a sectional area which extends through the magnetic field sensor and along the rotation axis. The second discharge element is typically embodied as a block or as a plate. In embodiments, the second discharge element comprises or is composed of ferrite, for example magnetically soft ferrite. The second discharge element can be disposed on the second sensor board. In embodiments, the second discharge element is connected to the second sensor board. For example, the second discharge element can be adhesively bonded or soldered to the second sensor board.

In typical embodiments, the second discharge element, in terms of the first direction, extends at least across a region of the magnetic strip, in particular at least across a region between two first discharge elements. In the case of a first direction which is aligned so as to be axial, a "region" in this context is to be understood to be in particular an axial region; in the case of a first direction which is aligned so as to be radial, it is to be understood to be in particular a radial region. The second discharge element is typically specified for directing magnetic stray fields about the magnetic field sensor of the position encoder, in particular at least substantially parallel to the first direction.

The rotatable part typically comprises a carrier of a magnetically conductive material, wherein the magnetic strip and the at least two pairs of magnets are disposed on the carrier. The carrier is typically specified for directing magnetic stray fields about the magnetic field sensor or the magnetic strip, in particular at least substantially parallel to the first direction. In embodiments, a magnetic strip carrier is disposed between the magnetic strip and the carrier. The magnetic strip carrier can be composed of a magnetically conductive material.

In typical embodiments, the magnetic field sensor of the position encoder by a shielding system of the encoder system is shielded in relation to magnetic interference fields. The shielding system typically comprises at least one of the group including the at least one first discharge element, the second discharge element, and the carrier. For example, the shielding system comprises at least in each case one first discharge element between the first magnets of the pairs of magnets and the magnetic strip and between the second magnets of the pairs of magnets and the magnetic strip, a second discharge element and a carrier. For example, the shielding system can be specified for interlacing a weak magnetic circuit of the position encoder and a strong magnetic circuit of the revolution counter. Interference fields about the magnetic field sensor of the position encoder can in particular be discharged. Interference fields can in particular comprise stray fields of the pairs of magnets or external interference fields. External interference fields can emanate from, for example, the operation of the drive, in particular of an electric motor, or from external electromagnetic radiation. Shielding of the magnetic field sensor according to embodiments described herein can have the advantage that an absolute position of the shaft can be determined with high accuracy. A high accuracy can in particular be achieved in association with a small construction volume of the encoder system.

The ratio of a first magnetic remanence induction of the magnetic strip to a second magnetic remanence induction of a first magnet of a pair of magnets or a second magnet of a pair of magnets is typically at least 1:15, in particular at least 1:10, or at least 1:8, or at most 1:2, in particular at most 1:3, or at most 1:4. The ratio can in particular be between 1:10 and 1:3. For example, a first magnetic remanence induction of the magnetic strip can be 0.1 T to 0.4 T. A second magnetic remanence induction of a first magnet or of a second magnet can be, for example, 0.8 T to 1.5 T.

In typical embodiments, the Wiegand sensor and the magnetic field sensor in the revolving direction are disposed so as to be mutually offset about the rotation axis of the rotatable part. The Wiegand sensor and the magnetic field sensor are typically disposed so as to be mutually offset by at least half the angular spacing between two pairs of magnets that are adjacent in the revolving direction. For example, in an embodiment having eight pairs of magnets, the Wiegand sensor and the magnetic field sensor are disposed so as to be mutually offset by at least 22.5°, whereby this offset is at least 45° in the case of four pairs of magnets. An intense distortion of the magnetic field of a pair of magnets at the location of the Wiegand sensor by a second discharge element on the magnetic field sensor can be avoided by a minimum offset in the revolving direction, for example.

In typical embodiments, the first direction is aligned so as to be axial. In each pair of magnets, the first magnet, the magnetic strip, and the second magnet in axial terms are in particular disposed in this sequence on the rotatable part. In each pair of magnets, the first magnet and the second magnet are typically disposed so as to be in one plane with the rotation axis. The first magnet and the second magnet in axial terms are typically disposed so as to be mutually offset. An axial embodiment can have the advantage, for example, that the encoder system can be installed with a particularly minor diameter, or that the encoder system can be free of destruction in the event of an axial displacement of the shaft.

In typical embodiments, the at least one first discharge element in each pair of magnets is disposed so as to be axially between the first magnet and the magnetic strip, or axially between the second magnet and the magnetic strip. In typical embodiments, the second discharge element is disposed so as to be radially outside the magnetic field sensor. In typical embodiments, the second discharge element in the radial direction is disposed so as to be further outside than the magnetic field sensor, in particular on the stationary part. For example, the sequence from radially inside to radially outside is: magnetic strip, magnetic field sensor, second discharge element. The terms "radial", "tangential" and "axial" here typically refer to the rotation axis.

In typical embodiments, the carrier is embodied as a sleeve, wherein the sleeve is specified for connecting in a rotationally fixed manner to a shaft of the drive. The sleeve in radial terms is typically disposed so as to be at least partially within the pairs of magnets or within the magnetic strip. The sleeve in radial terms is in particular typically disposed so as to be at least partially within the pairs of magnets and within the magnetic strip.

In typical embodiments, the sleeve is embodied in one part. In other embodiments, the sleeve is embodied in two parts; in particular at least one or all elements of the group comprising a first discharge element, a magnet of a pair of magnets, and a track of the magnetic strip can in each case be disposed on both parts of the sleeve.

In further typical embodiments of the encoder system, the first direction is aligned so as to be radial. In each pair of magnets, the first magnet and the second magnet in radial terms are disposed so as to be mutually offset. The magnetic strip in each pair of magnets in radial terms is in particular disposed between the first magnet and the second magnet. Radial embodiments can in particular enable a construction mode which is particularly flat in axial terms.

In typical embodiments, the at least one first discharge element in each pair of magnets in radial terms is disposed between the first magnet and the magnetic strip, or between the second magnet and the magnetic strip. In typical embodiments, the second discharge element, the magnetic field sensor, and the magnetic strip in terms of an axial direction are disposed in this sequence.

In typical embodiments, the carrier is embodied as a disk, wherein the disk is specified for connecting in a rotationally fixed manner to the shaft. The disc is typically disposed so as to be coaxial with the rotation axis of the encoder system.

Typical embodiments comprise an electric motor having a shaft and an encoder system according to embodiments described herein. The stationary part of the encoder system is typically connected in a rotationally fixed manner to a housing of the electric motor. The rotatable part of the encoder system is typically connected in a rotationally fixed manner to the shaft of the electric motor. The shaft of the electric motor can be equipped with further permanent magnets, for example with further permanent magnets of a rotor of the electric motor.

In typical embodiments, the shaft of the electric motor is embodied as a hollow shaft, in particular as a continuous hollow shaft. A hollow shaft can offer the advantage, for example, that cables can be routed through the hollow shaft in a space-saving manner. In further typical embodiments, the shaft is embodied as a solid shaft.

Typical embodiments, which can in particular be combined with typical encoder systems described herein, relate to an encoder system having a revolution counter. The revolution counter comprises a first sensor, wherein the first sensor is disposed on a first sensor board of the encoder system. The first sensor is typically a magnetic sensor, for example a Wiegand sensor. The Wiegand sensor can be embodied as an SMD component, for example. The encoder system typically comprises a position encoder having a second sensor, wherein the second sensor is disposed on a second sensor board of the encoder system. The second sensor is typically a magnetic sensor, for example a magnetic field sensor according to embodiments described herein. The second sensor board can carry further electrical auxiliary components, for example a resistor, a capacitor, or a memory chip. The second sensor board can in particular carry a second discharge element according to embodiments described herein. The second discharge element is typically connected, for example soldered or adhesively bonded, to the second sensor board.

Typical encoder systems comprise a motherboard which is specified for connecting to a housing of the drive. In embodiments, the motherboard by way of conductor tracks on the motherboard provides an electrical connection between the first sensor board and the second sensor board. The motherboard typically comprises various electrical components, for example an electrical protective circuit or a voltage regulator. In typical embodiments, the motherboard provides an electrical interface, for example a board plug, for supplying power to the encoder system or for communication between the motherboard and an electronic evaluation system of the encoder system.

The first sensor board and the second sensor board are typically connected directly to the motherboard. The first sensor board and the second sensor board are in particular not releasable in a non-destructive manner from the motherboard. The first sensor board or the second sensor board can be connected to the motherboard by way of a plug connection, an adhesively bonded connection or a soldered connection, for example. An electrical connection between the first sensor board and the motherboard, or between the second sensor board and the motherboard, can be provided by way of a soldered connection or by way of a cable connection. In further embodiments, the first sensor board, the second sensor board and the motherboard can be embodied as rigid/flexible circuit boards.

In typical embodiments, the first sensor board or the second sensor board, in particular both, are in each case aligned so as to be at least substantially axial, in particular so as to be at least substantially axial and at one point of the respective sensor so as to be at least substantially tangential in terms of the rotation axis of the encoder system. The motherboard is typically aligned so as to be at least substantially perpendicular to the rotation axis. "At least substantially" is to be understood to be in particular a variance of at most 20°, in particular of at most 10°, or of at most 5°, from an exactly axial, tangential or radial alignment. In typical embodiments, the first sensor board or the second sensor board, in particular both, are aligned so as to be at least substantially perpendicular to the motherboard.

In comparison to the prior art, typical embodiments of the encoder system can offer the advantage that a particularly compact construction mode is provided. In particular, embodiments can have a minor diameter or a minor axial thickness. Embodiments can furthermore offer the advantage that an absolute position can be determined with high accuracy. A further advantage of typical embodiments can be that the magnetic field sensor is shielded in relation to interference fields, in particular in relation to stray fields of the revolution counter, or in relation to external interference fields.

BRIEF DESCRIPTION OF THE DRAWINGS

Further advantages and features of preferred embodiments of the invention will be explained hereunder by means of the appended drawings in which.

DETAILED DESCRIPTION

Typical embodiments will be described hereunder by means of the figures, whereby the invention is not limited to the exemplary embodiments, the scope of the invention rather being determined by the claims.

In the description of the figures, the same reference signs are used for identical or equivalent parts. In some instances, features which have already been described in the context of other figures are not described once again for the sake of clarity.

Figure 1:
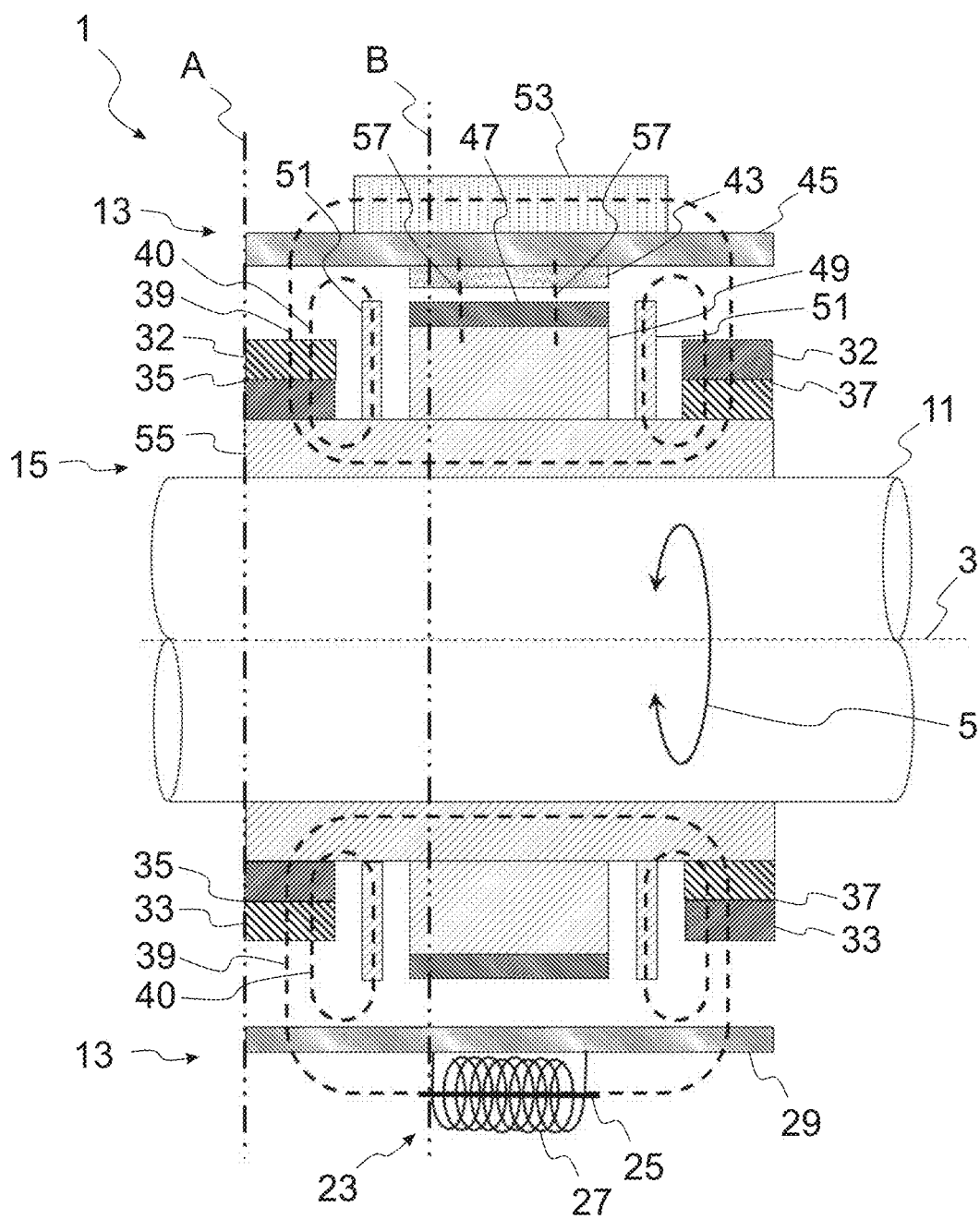
FIG. 1 shows a schematic sectional view of a typical encoder system.

FIG. 1 shows a schematic sectional view of a typical encoder system 1 along a rotation axis 3 of the encoder system 1. The encoder system 1 comprises a stationary part 13 and a rotatable part 15. The stationary part 13 is specified for connecting in a rotationally fixed manner to a housing of a drive. The rotatable part 15 is connected to a shaft 11 of the drive. The shaft 11 and the rotatable part 15 are rotatable about the rotation axis 3. The embodiments illustrated in FIGS. 1 to 4 show in particular such embodiments of an encoder system in which a first direction of the encoder system is aligned so as to be axial.

Figure 2:
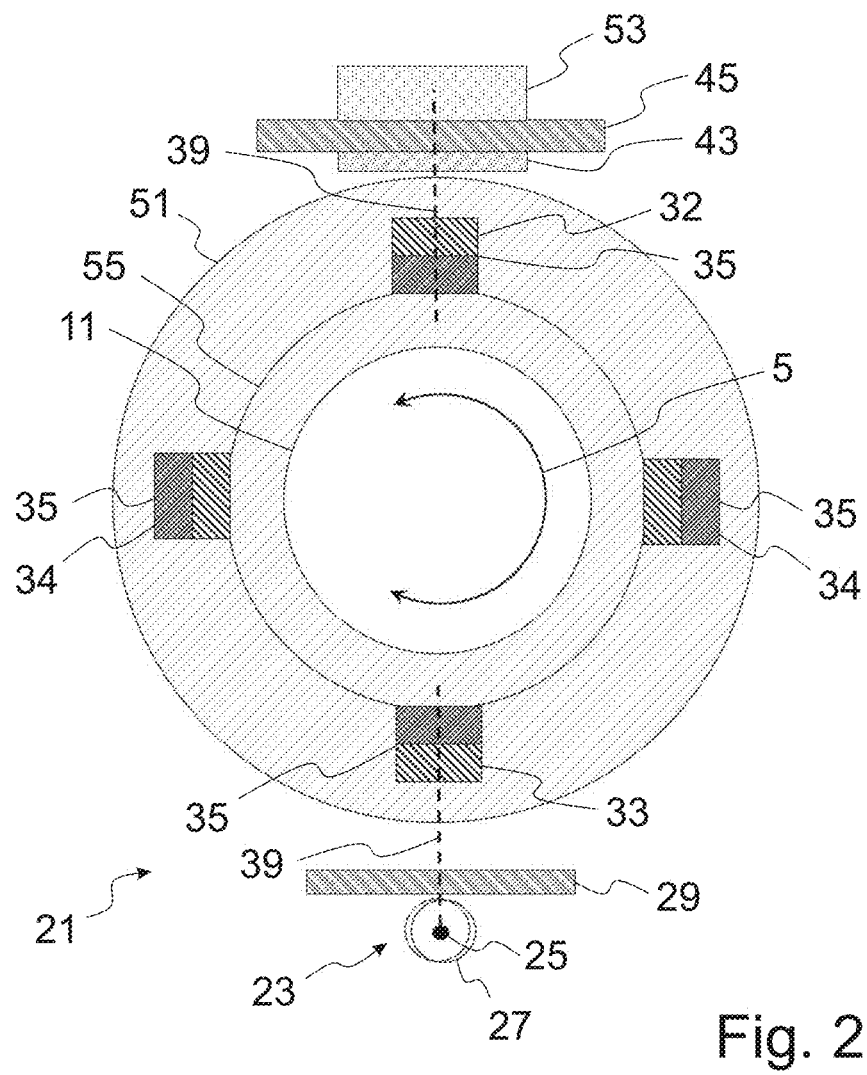
FIG. 2 shows a schematic sectional view of a typical encoder system, in particular a view onto the sectional area A of FIG. 1.

The encoder system 1 comprises a revolution counter which hereunder will be described in particular in the context of FIGS. 1 and 2. FIG. 2 shows in particular a view onto the sectional area A of FIG. 1. The revolution counter is generally provided with the reference sign 21 in FIG. 2. The revolution counter comprises a Wiegand sensor 23 which is disposed on the stationary part 13, in particular on a first sensor board 29. The Wiegand sensor 23 comprises a Wiegand wire 25 and a Wiegand coil 27. The Wiegand coil 27 is wound about the Wiegand wire 25.

The revolution counter comprises pairs of magnets which are disposed on the rotatable part 15. The pairs of magnets are in particular disposed on a carrier 55 of the encoder system 1, wherein the carrier 55 in FIG. 1 is embodied in an exemplary manner as a sleeve. The carrier 55 is produced from a magnetically conductive material, in particular from ferromagnetic material. In the exemplary embodiment of FIGS. 1 and 2, four pairs of magnets are disposed on the rotatable part 15. The pairs of magnets comprise in particular a first pair of magnets 32 which in FIGS. 1 and 2 is situated in a position close to a magnetic field sensor 43, a second pair of magnets 33 at a position close to the Wiegand sensor 23, and two further pairs of magnets 34, the latter being disposed so as to be mutually opposite and in each case between the first pair of magnets 32 and the second pair of magnets 33 (FIG. 2). The pairs of magnets are disposed so as to be uniformly distributed in the revolving direction 5, having an angular spacing of 90° between pairs of magnets which are adjacent in the revolving direction 5.

The pairs of magnets comprise in each case a first magnet 35 and a second magnet 37. In each pair of magnets, the first magnet 35 and the second magnet 37 have antiparallel magnetic dipole moments. The pairs of magnets in the revolving direction 5 have alternating polarities. As is illustrated in FIG. 2, the first magnets 35 in the revolving direction 5 have alternating polarities, for example. In particular, the first magnets 35 are aligned such that the first magnets 35 in the revolving direction 5 are directed radially outward in an alternating manner by way of a north pole or by way of a south pole. The second magnets 37 in the revolving direction 5 also have alternating polarities.

In each pair of magnets, the first magnet 35 and the second magnet 37 form a magnetic circuit having first flux lines 39. A magnetic circuit generated by a pair of magnets in the rotation of the pair of magnets toward the position of the Wiegand sensor 23 is suitable for reversing the polarity of the Wiegand wire 25. The reversal of the polarity of the Wiegand wire 25 can induce a voltage pulse in the Wiegand coil 27. The voltage pulse can serve as a counting signal for counting the revolutions, in FIG. 1 for detecting quarter rotations, for example. In the state of the encoder system without voltage, the voltage pulse can furthermore serve for memorizing the counting signal or a counting result in a non-volatile memory of the encoder system 1.

Figure 3:
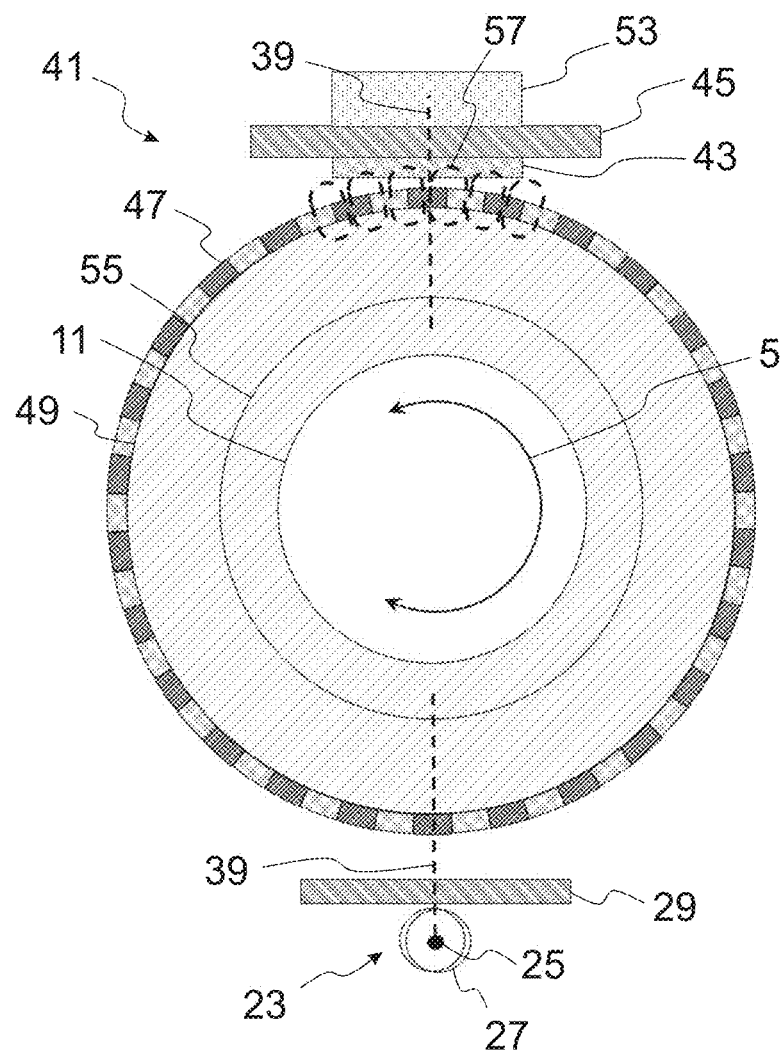
FIG. 3 shows a schematic sectional view of a typical encoder system, in particular view onto the sectional area B of FIG. 1.

The encoder system 1 comprises a position encoder, as is illustrated in particular in FIGS. 1 and 3. FIG. 3 shows a view onto the sectional area B of FIG. 1. The position encoder in FIG. 3 is generally provided with the reference sign 41. The position encoder comprises the magnetic field sensor 43, for example a Hall sensor array. The magnetic field sensor 43 is disposed on the stationary part 13 of the encoder system 1, in particular on a second sensor board 45 of the encoder system 1. The magnetic field sensor 43 is illustrated as being disposed so as to be offset by 180° in the revolving direction 5 in relation to the Wiegand sensor 23.

In further embodiments, the magnetic field sensor is disposed by less than 180° in the revolving direction.

The position encoder comprises a magnetic strip 47 which is disposed on the rotatable part 15. The magnetic strip 47 is in particular disposed on a magnetic strip carrier 49. The magnetic strip carrier 49 is connected in a rotationally fixed manner to the carrier 55 and so as to be centric in axial terms. The magnetic strip 47 in FIGS. 1 and 3 has two magnetic tracks with a Nonius code (Vernier code). A magnetic track having portions of alternating polarities is in particular illustrated in the sectional view of FIG. 3. In the exemplary embodiment of FIG. 3, a magnetic track has 63 pairs of poles, for example, wherein a lesser number has been illustrated for reasons of simplification. A further magnetic track, not illustrated, has 64 pairs of poles, for example. The magnetic field sensor 43 is specified for measuring magnetic fields of the magnetic strip 47, for example the second flux lines 57 of the two magnetic tracks of the magnetic strip 47 which are schematically illustrated in FIGS. 1 and 3.

A position encoder is typically equipped with a magnetic strip with a Nonius code so as to determine for the magnetic tracks in each case one phase based on magnetic field measurements of the magnetic field sensor. A phase indicates, for example, an angular position of a pole of the magnetic strip that is close to the magnetic field sensor or is next to said magnetic field sensor. By virtue of the dissimilar divisions of the magnetic tracks according to the Nonius principle, there is an unequivocal phase relationship between the phases of the magnetic strips, the absolute position of the shaft being able to be calculated therefrom based on the phases of the magnetic tracks. In further embodiments, an absolute position can be calculated based on a Gray code of a magnetic strip.

In each pair of magnets in FIG. 1, the first magnet 35, the magnetic strip 47, and the second magnet 37 in terms of a first direction, in FIG. 1 in terms of an axial direction, are disposed in this sequence. The magnetic strip 47 in each pair of magnets, in axial terms, is in particular disposed between the first magnet 35 and the second magnet 37.

A first discharge element 51 is in each case disposed on the rotatable part 15 so as to be between the first magnet 35 and the magnetic strip 47, and between the second magnet 37 and the magnetic strip 47. The first discharge elements 51 are in particular disposed on the carrier 55. In FIGS. 1 and 2, the first discharge elements 51 are in each case embodied as an encircling disk about the carrier 55. The first discharge elements 51 are specified for discharging stray fields, for example stray lines 40, that emanate from the pairs of magnets, in particular for discharging the latter in a second direction which is directed so as to be perpendicular to the first direction. Stray fields having stray lines 40 can thus be shorted by way of the first discharge elements 51 and the carrier 55, for example, and in particular be kept away from the magnetic field sensor 43 and the magnetic strip 47.

The encoder system 1 comprises a second discharge element 53. The second discharge element 53 is disposed on the stationary part 13 of the encoder system 1, in particular fixedly connected, for example adhesively bonded, to the second sensor board 45. The second discharge element 53 is disposed so as to be radially outside the magnetic field sensor 43. In particular, the magnetic field sensor 43, in terms of a radial, second direction, is disposed between the second discharge element 53 and the magnetic strip 47. The second discharge element 53 in FIG. 1 is embodied as a ferrite block. The second discharge element 53 in FIG. 1, in axial terms, on both sides extends beyond an axial region between the two first discharge elements 51.

In FIG. 1, the first discharge elements 51, the second discharge element 53, and the carrier 55 form a shielding system for shielding or discharge in magnetic interference fields. The magnetic strip 47 and the magnetic field sensor 43 can be shielded by discharging the interference fields, in particular the stray fields of the pairs of magnets. For example, an exact determination of the absolute position can be enabled by the shielding. In particular, the shielding system guides a magnetic circuit generated by a pair of magnets at the position of the magnetic field sensor 43 about the magnetic field sensor 43. Further stray fields of the pair of magnets in the direction of the magnetic field sensor 43 are in particular discharged in a second direction by the first discharge elements 51. The shielding system permits a disposal of the encoder system in which a weak magnetic circuit (second flux lines 57) of the position encoder and a strong magnetic circuit (first flux lines 39) of the revolution counter are interlaced. In particular, the weak magnetic circuit and the strong magnetic circuit can be adequately decoupled from one another in order for the absolute position to be determined. An encoder system which is particularly space-saving can be provided, for example.

Figure 4:
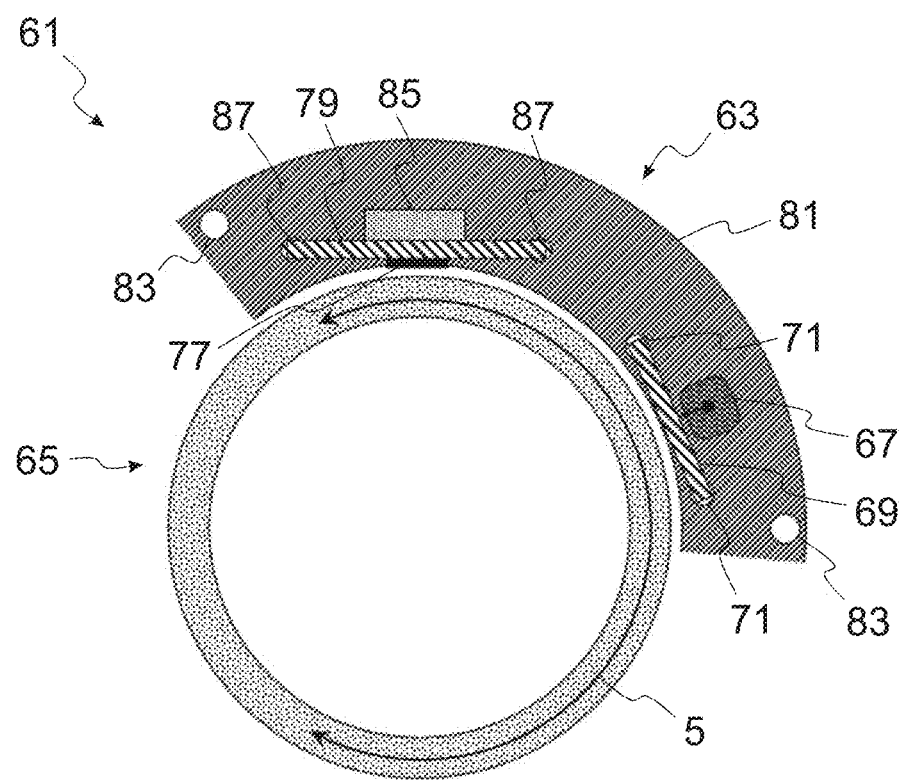
FIG. 4 shows a schematic sectional view of a further typical encoder system.

FIG. 4 shows a schematic sectional view of an encoder system 61. A rotatable part 65 of the encoder system 61 is illustrated in a simplified manner for the sake of clarity in FIG. 4. The encoder system 61 comprises a stationary part 63 having a motherboard 81 which is specified for connecting in a rotationally fixed manner to a housing of a drive. The motherboard 81 has in particular fastening bores 83. The fastening bores 83 are specified for fastening, for example for fixedly screwing, the motherboard 81 to the housing of the drive.

The encoder system 61 comprises a revolution counter having a first sensor 67, in FIG. 4 a Wiegand sensor in one of the embodiments described herein, for example. The first sensor 67 is disposed on a first sensor board 69. The first sensor board 69 is mechanically connected to the motherboard 81 by way of first plug connections 71. The first plug connections 71 are provided by cams of the first sensor board 69 which engage in openings of the motherboard 81. Additionally, electrical contacts of the first sensor board 69 and of the motherboard 81 are soldered to one another.

The encoder system 61 in FIG. 4 comprises a position encoder having a second sensor 77, for example a magnetic field sensor in one of the embodiments described herein. The second sensor 77 is disposed on a second sensor board 79. In the exemplary embodiment of FIG. 4, a second discharge element 85 is disposed so as to be radially outside the second sensor 77 on the second sensor board 79. The second sensor board 79 is mechanically connected to the motherboard 81 by way of second plug connections 87. The second plug connections 87 are provided by cams of the second sensor board 79 which engage in openings of the motherboard 81. Electrical contacts of the second sensor board 79 and of the motherboard 81 are soldered to one another.

The first sensor board 69 and the second sensor board 79 are in each case aligned so as to be perpendicular to the motherboard 81. In particular, the first sensor board 69 at one point of the first sensor 67 is aligned so as to be substantially tangential in terms of the rotation axis of the encoder system 61. The second sensor board 79 at one point of the second sensor 77 is aligned so as to be substantially tangential in terms of the rotation axis.

An encoder system according to embodiments can be easily assembled, flexibly adapted to different drives, or produced in a cost-effective manner, for example.

Features of the exemplary embodiments of FIGS. 1 to 4 can be combined with one another; in an encoder system having a board assembly according to the exemplary embodiment of FIG. 4, features which have been described in the context of other encoder systems disclosed herein can in particular be used.

The invention claimed is:

1. Encoder system (1) for a drive, comprising:
a revolution counter having
a Wiegand sensor (23) which is disposed on a stationary part (13) of the encoder system (1); and
at least two pairs of magnets which in the revolving direction (5) are disposed at different positions on a rotatable part (15) of the encoder system (1);
wherein the pairs of magnets comprise in each case a first magnet (35) and a second magnet (37), wherein the first magnet and the second magnet are disposed at least substantially at the same position in the revolving direction; and
a position encoder having a magnetic field sensor (43) which is disposed on the stationary part (13), and a magnetic strip (47) which is disposed on the rotatable part (15);
wherein, in each pair of magnets, the first magnet (35), the magnetic strip (47) of the position encoder, and the second magnet (37) in terms of a first direction are disposed in this sequence on the rotatable part (15).

2. Encoder system (1) according to claim 1, comprising at least one first discharge element (51) which is of a magnetically conductive material and disposed between the respective first magnet (35) and the magnetic strip (47), and/or between the respective second magnet (37) and the magnetic strip (47).

3. Encoder system (1) according to claim 2, wherein the magnetic field sensor (43) by a shielding system of the encoder system (1) is shielded in relation to magnetic interference fields, wherein the shielding system comprises at least one of the group including the at least one first discharge element (51), a second discharge element (53) and a carrier (55) of the rotatable part (15).

4. Encoder system (1) according to claim 1, comprising a second discharge element (53) which is of a magnetically conductive material and disposed on the stationary part (13), wherein the magnetic field sensor (43) in terms of a second direction, which is aligned so as to be at least substantially perpendicular to the first direction, is disposed between the magnetic strip (47) and the second discharge element (53).

5. Encoder system (1) according to claim 1, wherein the Wiegand sensor (23) and the magnetic field sensor (43) in the revolving direction (5) are disposed so as to be mutually offset about a rotation axis (3) of the rotatable part (15).

6. Encoder system (1) according to claim 1, wherein the magnetic strip (47) comprises at least two magnetic tracks.

7. Encoder system (1) according to claim 1, wherein the ratio of a first magnetic remanence induction of the magnetic strip (47) to a second magnetic remanence induction of a first magnet (35) of a pair of magnets, or a second magnet (37) of a pair of magnets, is at least 1:15 and at most 1:2.

8. Encoder system (1) according to claim 1, wherein the rotatable part (15) comprises a carrier (55) of a magnetically conductive material, and wherein the magnetic strip (47) and the at least two pairs of magnets are disposed on the carrier (55).

9. Encoder system (1) according to claim 1, wherein the first direction is aligned so as to be axial.

10. Encoder system (1) according to claim 9, wherein a carrier (55) of the rotatable part (15) is embodied as a sleeve, wherein the sleeve is specified for connecting in a rotationally fixed manner to a shaft (11) of the drive.

11. Encoder system (1) according to claim 1, wherein the first direction is aligned so as to be radial.

12. Encoder system (1) according to claim 11, wherein a carrier (55) of the rotatable part (15) is embodied as a disk, wherein the disk is specified for connecting in a rotationally fixed manner to a shaft (11).

13. Electric motor, having
a shaft (11); and
an encoder system (1) according to claim 1.

14. Electric motor according to claim 13, wherein the shaft (11) is embodied as a hollow shaft.

15. Encoder system according to claim 1, wherein
the Wiegand sensor is disposed on a first sensor board (69) of the encoder system;
the magnetic field sensor is disposed on a second sensor board (79) of the encoder system (61); and further comprising:
a motherboard (81) which is specified for connecting to a housing of the drive;
wherein the first sensor board (69) and the second sensor board (79) are connected directly to the motherboard (81), and wherein the first sensor board and the second sensor board are arranged at least substantially perpendicular to the motherboard.

* * * * *